(12) United States Patent
Koda et al.

(10) Patent No.: US 12,450,958 B2
(45) Date of Patent: Oct. 21, 2025

(54) DISPLAY CONTROL DEVICE, DISPLAY CONTROL METHOD, AND STORAGE MEDIUM

(71) Applicant: HONDA MOTOR CO., LTD., Tokyo (JP)

(72) Inventors: Ryo Koda, Tokyo (JP); Akira Kabasawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 288 days.

(21) Appl. No.: 18/133,547

(22) Filed: Apr. 12, 2023

(65) Prior Publication Data

US 2023/0351822 A1   Nov. 2, 2023

(30) Foreign Application Priority Data

Apr. 28, 2022 (JP) .................................. 2022-074388

(51) Int. Cl.
*B60L 58/12* (2019.01)
*B60L 53/63* (2019.01)
(Continued)

(52) U.S. Cl.
CPC ............ *G07C 5/0825* (2013.01); *B60L 53/63* (2019.02); *B60L 53/66* (2019.02); *B60L 58/12* (2019.02); *G01D 7/005* (2013.01); *G06T 11/001* (2013.01)

(58) Field of Classification Search
CPC ....... G07C 5/0825; B60L 53/63; B60L 53/66; B60L 58/12; B60L 2240/622; B60L 2240/72; B60L 2250/16; B60L 2260/52; B60L 2260/54; B60L 53/67; B60L 53/68; B60L 3/12; G01D 7/005; G06T 11/001;
(Continued)

(56) References Cited

U.S. PATENT DOCUMENTS 8,716,978 B2 * 5/2014 Kim ........................ B60L 53/63
320/109
10,953,766 B2 * 3/2021 Loeffler ................ B60L 53/665
(Continued)

FOREIGN PATENT DOCUMENTS

JP   2010-220352   9/2010
JP   2012-110170   6/2012
(Continued)

OTHER PUBLICATIONS

Japanese Office Action for Japanese Patent Application No. 2022-074388 mailed Feb. 6, 2024.

*Primary Examiner* — Nay Tun
(74) *Attorney, Agent, or Firm* — Amin, Turocy & Watson, LLP

(57) ABSTRACT

According to an embodiment, a display control device includes an acquirer configured to acquire information including source information of power that is supplied when a battery mounted in a vehicle is charged, a deriver configured to derive an environmental load level that is an influence level of an environmental load of the power with which the battery is charged on the basis of the source information acquired by the acquirer, and a display controller configured to cause a display to display an image in which the environmental load level derived by the deriver is associated with a breakdown of a battery level.

9 Claims, 8 Drawing Sheets

(51) Int. Cl.
  *B60L 53/66* (2019.01)
  *G01D 7/00* (2006.01)
  *G06T 11/00* (2006.01)
  *G07C 5/08* (2006.01)

(58) Field of Classification Search
  CPC ........... Y02T 10/70; B60K 35/00; B60R 1/00; B60R 16/023
  See application file for complete search history.

(56) References Cited

U.S. PATENT DOCUMENTS

| | | | | |
|---|---|---|---|---|
| 10,994,625 | B2* | 5/2021 | Okumura | B60L 53/51 |
| 11,192,466 | B2* | 12/2021 | Harty | B60L 58/13 |
| 12,203,762 | B2* | 1/2025 | Kim | G01C 21/3469 |
| 2011/0191186 | A1* | 8/2011 | Levy | G06Q 30/0241 |
| | | | | 709/227 |
| 2012/0075090 | A1* | 3/2012 | Satake | B60L 53/14 |
| | | | | 340/455 |
| 2012/0215371 | A1* | 8/2012 | Seo | H02J 13/00004 |
| | | | | 700/296 |
| 2012/0249068 | A1* | 10/2012 | Ishida | B60L 55/00 |
| | | | | 320/109 |
| 2013/0234654 | A1* | 9/2013 | Tsuchiya | H01M 10/46 |
| | | | | 324/426 |
| 2014/0049216 | A1* | 2/2014 | Nakagawa | B60L 55/00 |
| | | | | 320/109 |
| 2016/0347195 | A1* | 12/2016 | Bridges | B60L 53/64 |
| 2019/0165589 | A1* | 5/2019 | Ichikawa | B60L 58/12 |
| 2020/0406771 | A1* | 12/2020 | Okumura | H02J 3/381 |
| 2022/0247174 | A1* | 8/2022 | Miller | G06Q 10/0631 |
| 2023/0015077 | A1* | 1/2023 | Kim | G01C 21/3469 |
| 2023/0196234 | A1* | 6/2023 | Bhimani | B60L 53/68 |
| | | | | 705/7.25 |
| 2023/0415604 | A1* | 12/2023 | Sakata | G06Q 50/06 |

FOREIGN PATENT DOCUMENTS

| | | |
|---|---|---|
| JP | 2014-039388 | 2/2014 |
| JP | 2014-050291 | 3/2014 |
| JP | 2019-097333 | 6/2019 |
| WO | 2021/038683 | 3/2021 |

* cited by examiner

| CHARGING DATE AND TIME INFORMATION | CHARGING LOCATION | AMOUNT OF POWER | SOURCE-RELATED INFORMATION |
|---|---|---|---|
| * * * | * * * | P1 | NON-FOSSIL |
| * * * | * * * | P2 | LIQUEFIED NATURAL GAS |
| * * * | * * * | P3 | COAL |

| SOURCE-RELATED INFORMATION | POWER COEFFICIENT [$g\text{-}CO_2/kWh$] | DISPLAY MODE |
|---|---|---|
| NON-FOSSIL (TOTAL) | $Pc=0$ | DISPLAY IN GREEN |
| MAINLY NON-FOSSIL | $0 < Pc < 300$ | DISPLAY IN BLUE |
| LIQUEFIED NATURAL GAS-FIRED POWER | $300 \leq Pc < 600$ | DISPLAY IN GRAY |
| COAL-FIRED POWER | $600 \leq Pc$ | DISPLAY IN BLACK |

252

| CHARGING FACILITY ID | LOCATION INFORMATION | SOURCE-RELATED INFORMATION |
|---|---|---|
| CF010 | * * * | NON-FOSSIL (TOTAL) |
| CF020 | * * * | MAINLY NON-FOSSIL |
| CF021 | * * * | MAINLY NON-FOSSIL |
| CF030 | * * * | LIQUEFIED NATURAL GAS-FIRED POWER |
| CF040 | * * * | COAL-FIRED POWER |
| ... | ... | ... |

DISPLAY CONTROL DEVICE, DISPLAY CONTROL METHOD, AND STORAGE MEDIUM

CROSS-REFERENCE TO RELATED APPLICATION

Priority is claimed on Japanese Patent Application No. 2022-074388, filed Apr. 28, 2022, the content of which is incorporated herein by reference.

BACKGROUND

Field of the Invention

The present invention relates to a display control device, a display control method, and a storage medium.

Description of Related Art

In recent years, research and development have been conducted on a charging and power-supply process in vehicles in which secondary batteries contributing to improving energy efficiency are mounted to ensure that more people have access to affordable, reliable, sustainable, and advanced energy. In this regard, in order to stably distribute power with a large environment-added value to the market, technology for adjusting and providing grid power and renewable energy when a battery mounted in an electric vehicle is charged at a ratio required by a user is known (for example, Japanese Unexamined Patent Application, First Publication No. 2010-220352).

SUMMARY

Meanwhile, in technology related to a charging and power-supply process for a vehicle in which a secondary battery is mounted, it is not possible to ascertain a source of power at a current battery level as well as a past charging history and it is difficult to intuitively ascertain an environmental load associated with the running of an electric vehicle after charging. Thus, it may be difficult to prompt a user to use energy suitable for an environment.

Aspects of the present invention have been made in consideration of such circumstances and an objective of the present invention is to provide a display control device, a display control method, and a storage medium capable of prompting a user to use energy more suitable for an environment. Also, the present invention contributes to improving energy efficiency.

A display control device, a display control method, and a storage medium according to the present invention adopt the following configurations.

(1): According to an aspect of the present invention, there is provided a display control device including: an acquirer configured to acquire information including source information of power that is supplied when a battery mounted in a vehicle is charged; a deriver configured to derive an environmental load level that is an influence level of an environmental load of the power with which the battery is charged on the basis of the source information acquired by the acquirer; and a display controller configured to cause a display to display an image in which the environmental load level derived by the deriver is associated with a breakdown of a battery level.

(2): In the above-described aspect (1), the display control device further includes a charging determiner configured to determine whether or not the vehicle is being charged; and a facility identifier configured to identify a charging facility on the basis of location information of the vehicle when the charging determiner determines that the vehicle is being charged, wherein the acquirer acquires the source information of the power with which the vehicle has been charged from the charging facility identified by the facility identifier.

(3): In the above-described aspect (1), the display controller causes the display to display the battery level in a display mode in which identification is possible for each piece of the source information of the power.

(4): In the above-described aspect (1), the display controller generates an image indicating the battery level so that consumption occurs in an order corresponding to the environmental load level virtually according to consumption of the power with which the battery is charged and causes the generated image to be displayed.

(5): In the above-described aspect (4), the display controller generates an image indicating the battery level so that the consumption occurs from power of a lowest environmental load level virtually.

(6): In the above-described aspect (4), the deriver derives a different color in accordance with the source information as the environmental load level, and the display controller causes the display to display an image in which the battery level is shown in a color obtained by mixing different colors according to the source information.

(7): In the above-described aspect (1), the display controller causes a color of an indicator lamp provided at a position within a prescribed distance from a charging port or an image indicating that charging is in progress displayed on the display to be displayed in a color according to the environmental load level when the vehicle is supplied with external power.

(8): According to an aspect of the present invention, there is provided a display control device including: an acquirer configured to acquire information including source information of power that is supplied when a battery mounted in a vehicle is charged; a deriver configured to derive an environmental load level that is an influence level of an environmental load of the power with which the battery is charged on the basis of the source information acquired by the acquirer and allocate a different color in accordance with the environmental load level; and a display controller configured to cause a prescribed portion of the vehicle to be displayed in a light-on state in a color corresponding to the environmental load level derived by the deriver by virtually associating current power consumption of the vehicle and the source information (9): According to an aspect of the present invention, there is provided a display control method including: acquiring, by a computer, information including source information of power that is supplied when a battery mounted in a vehicle is charged; deriving, by the computer, an environmental load level that is an influence level of an environmental load of the power with which the battery is charged on the basis of the acquired source information; and causing, by the computer, a display to display an image in which the derived environmental load level is associated with a breakdown of a battery level.

(10): According to an aspect of the present invention, there is provided computer-readable non-transitory storage medium storing a program for causing a computer to: acquire information including source information of power that is supplied when a battery mounted in a vehicle is charged; derive an environmental load level that is an influence level of an environmental load of the power with which the battery is charged on the basis of the acquired source information; and cause a display to display an image in which the derived environmental load level is associated with a breakdown of a battery level.

According to the above-described aspects (1) to (10), it is possible to prompt a user to use energy more suitable for an environment.

BRIEF DESCRIPTION OF THE DRAWINGS

FIG. 3 is a diagram showing an example of battery information.

FIG. 4 is a diagram showing an example of display mode information.

DESCRIPTION OF EMBODIMENTS

Hereinafter, embodiments of a display control device, a display control method, and a storage medium according to the present invention will be described with reference to the drawings. Hereinafter, it is assumed that the display control device is mounted in a vehicle (hereinafter referred to as a vehicle M). The vehicle M is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination thereof. The electric motor operates using electric power generated by a power generator connected to the internal combustion engine or electric power that is supplied when a battery (an example of a power storage) is discharged. Hereinafter, it is assumed that the vehicle M is an electric vehicle that runs with an electric motor driven by electric power supplied from an in-vehicle battery, such as, for example, a battery electric vehicle (BEV) or a hybrid electric vehicle (HEV).

Overall Configuration

Figure 1:
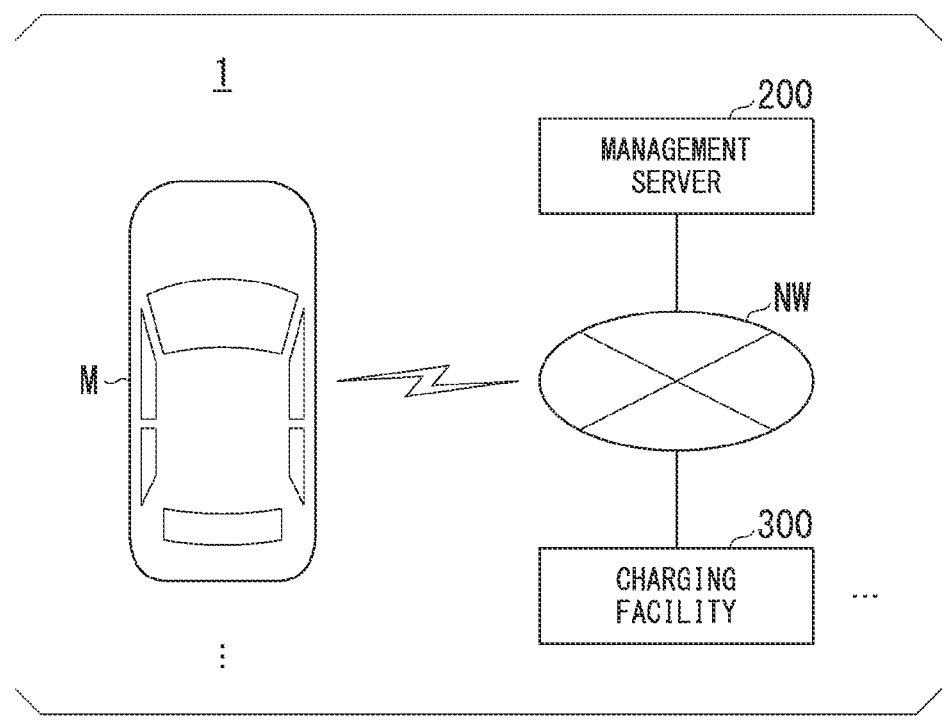
FIG. 1 is a configuration diagram of a power management system including a vehicle in which a display control device according to an embodiment is mounted.

FIG. 1 is a configuration diagram of a power management system 1 including a vehicle in which the display control device according to an embodiment is mounted. The power management system 1 includes, for example, the vehicle M, a management server 200, and a charging facility 300. The power management system 1 may manage a plurality of vehicles M and the charging facility 300. The vehicle M, the management server 200, and the charging facility 300 can communicate with each other via, for example, the network NW. The network NW includes, for example, a cellular network, a Wi-Fi network, Bluetooth (registered trademark), the Internet, a wide area network (WAN), a local area network (LAN), a public circuit, a provider device, a dedicated circuit, a radio base station, and the like.

The vehicle M transmits information about a charging situation of the battery mounted in the vehicle M, information about a location of the vehicle M, and the like to the management server 200 via the network NW or receives information transmitted from the management server 200 and provides the received information to a user (a driver) in the vehicle M.

The management server 200 manages location information of each charging facility 300 for battery charging managed by the power management system 1, source information of power supplied from the charging facility 300, and a greenhouse gas (CHG) emission amount for the power. The source information is, for example, information indicating what facility or material the supplied power has been generated from. Facilities include, for example, a wind power generation facility, a solar power generation facility, a geothermal power generation facility, a thermal power generation facility, a nuclear power generation facility, a hydroelectric power generation facility, and the like. The source information may include information indicating whether or not the facility is a renewable energy power generation facility. Materials include, for example, non-fossil materials, liquefied natural gas (LNG), coal, and the like. The GHG emission amount is, for example, an index value (a power coefficient) indicating how much greenhouse gases are emitted to generate a prescribed amount of power. Greenhouse gases include, for example, $CO_2$. For example, the smaller the power coefficient, the smaller the GHG emission amount and the smaller an impact on an environmental load (an environment impact level). For example, the management server 200 acquires information such as location information, source information, and a power coefficient of the charging facility 300 from an electric power company, a management company of the charging facility 300, and the like via the network NW, and manages the acquired information.

The charging facility 300 is a facility for charging a battery mounted in the vehicle M. The charging facility 300 is provided, for example, in a parking lot in a home or a commercial facility, a battery store (e.g., a dealer), a charging spot, and the like. The charging facility 300 may have, for example, a communication function of communicating with the vehicle M being charged at the charging facility 300 and the management server 200. In the case of communication with the vehicle M, the charging facility 300 may perform communication by wire (for example, a signal cable to be described below) or may perform communication wirelessly. For example, the charging facility 300 acquires the location information of the vehicle M and information about the battery mounted in the vehicle M, and transmits the acquired information to the management server 200 via the network NW. The charging facility 300 may transmit information received from the management server 200 (for example, source information and information about a power coefficient) to the vehicle M.

Next, functions of the vehicle M and the management server 200 will be specifically described.

[Vehicle]

Figure 2:
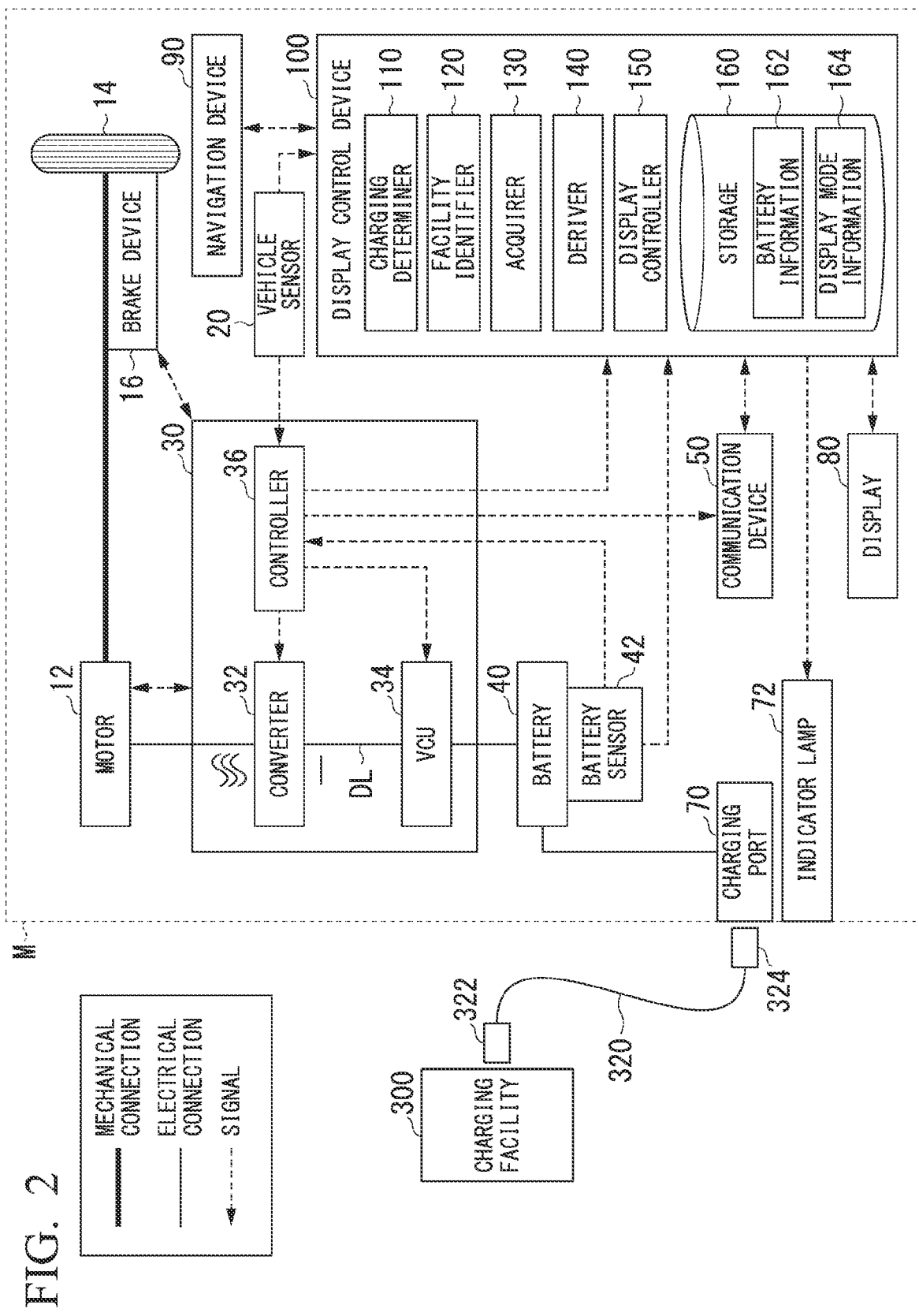
FIG. 2 is a diagram showing an example of a configuration of the vehicle according to the embodiment.

FIG. 2 is a diagram showing an example of a configuration of the vehicle M according to the embodiment. The vehicle M includes, for example, a motor 12, a drive wheel 14, a brake device 16, a vehicle sensor 20, a power control unit (PCU) 30, a battery 40, a battery sensor 42, a communication device 50, a charging port 70, an indicator lamp 72, a display 80, a navigation device 90, and a display control device 100.

The motor 12 is, for example, a three-phase alternating current (AC) motor. A rotor of the motor 12 is connected to the drive wheel 14. The motor 12 outputs motive power to the drive wheel 14 using supplied electric power. The motor 12 generates power using kinetic energy of the vehicle M when the vehicle M is decelerating. The energy generated by the motor 12 may be used to charge the battery 40.

The brake device 16 includes, for example, a brake caliper, a cylinder that transfers hydraulic pressure to the brake caliper, and an electric motor that generates hydraulic pressure in the cylinder. The brake device 16 may include a mechanism that transfers hydraulic pressure generated according to an operation of a brake pedal to the cylinder via a master cylinder as a backup. Also, the brake device 16 is not limited to the above-described configuration and may be an electronically controlled hydraulic brake device that transfers the hydraulic pressure of the master cylinder to the cylinder. When the brake device 16 is operated, the motor 12 generates a regenerative current. The energy due to this regenerative current (regenerative energy) may be used to charge the battery 40.

The vehicle sensor 20 includes, for example, an accelerator opening degree sensor, a vehicle speed sensor, a brake depression amount sensor, a location sensor (an example of a location acquirer), and a temperature sensor. The accelerator opening degree sensor is attached to an accelerator pedal and detects the operation amount of the accelerator pedal as an accelerator opening degree. The vehicle speed sensor includes, for example, a wheel speed sensor attached to each wheel and a speed calculator, and derives a speed of a vehicle (a vehicle speed) in combination with a wheel speed detected by the wheel speed sensor. The brake depression amount sensor is attached to the brake pedal and detects the operation amount of the brake pedal as the brake depression amount. The location sensor acquires the location information of the vehicle M by, for example, a global navigation satellite system (GNSS) receiver (not shown). The temperature sensor detects a temperature inside of the vehicle or a temperature outside of the vehicle. Information acquired by each sensor described above is output to the controller 36 or the display control device 100.

The PCU 30 includes, for example, a converter 32, a voltage control unit (VCU) 34, and a controller 36. A case where the above-described components are collectively configured as the PCU 30 is only an example. The above components may be disposed in a distributed manner.

The converter 32 is, for example, an AC-direct current (DC) converter. A DC side terminal of the converter 32 is connected to a DC link DL. The battery 40 is connected to the DC link DL via the VCU 34. The converter 32 converts an AC generated by the motor 12 into a DC and outputs the DC to the DC link DL.

The VCU 34 is, for example, a DC-DC converter. The VCU 34 boosts electric power supplied from the battery 40 and outputs the boosted electric power to the DC link DL.

The controller 36 includes, for example, a motor controller, a brake controller, and a battery/VCU controller. The motor controller, the brake controller, and the battery/VCU controller may be replaced with separate control devices, for example, control devices such as a motor ECU, a brake ECU, and a battery ECU.

The controller 36 controls the motor 12 on the basis of the output of the vehicle sensor 20 in the motor controller. The controller 36 controls the brake device 16 on the basis of the output of the vehicle sensor 20 in the brake controller. The controller 36 calculates a state of charge (SOC) of the battery 40 on the basis of the output of the battery sensor 42 attached to the battery 40 in the battery/VCU controller and outputs the calculated SOC to the VCU 34 and the display control device 100. The calculation and output of the SOC may be performed repeatedly at prescribed timings. The controller 36 outputs information about the vehicle speed output by the vehicle sensor 20 to the display control device 100. The VCU 34 increases a voltage of the DC link DL in accordance with an instruction from the battery/VCU control. The controller 36 acquires an amount of power generation energy and an amount of regenerative energy from the motor 12. The controller 36 may estimate a deterioration degree of the battery on the basis of the information acquired from the battery sensor 42 or learn a deterioration state of the battery 40.

The battery 40 is, for example, a secondary battery such as a lithium-ion battery or an all-solid-state battery. The battery 40 stores power for running of the vehicle M. For example, the battery 40 is charged with power supplied from the external charging facility 300 via the charging port 70 of the vehicle M to store the power and is discharged for running of the vehicle M. The battery 40 may store power for running of the vehicle M and the like with the power generation energy and the regenerative energy described above.

The charging port 70 is provided facing the outside of the vehicle body of the vehicle M. The charging port 70 is connected to the charging facility 300 via the charging cable 320. The charging cable 320 includes, for example, a first plug 322 and a second plug 324. The first plug 322 is connected to the charging facility 300 and the second plug 324 is connected to the charging port 70. Electricity supplied from the charging facility 300 is supplied to the charging port 70 via the charging cable 320. The charging cable 320 includes a signal cable attached to a power cable. The signal cable mediates communication between the vehicle M and the charging facility 300.

Therefore, a power connector for connecting the power cable and a signal connector for connecting the signal cable is provided in each of the first plug 322 and the second plug 324. A connection circuit (not shown) may be provided between the charging port 70 and the battery 40. The connection circuit transmits DC power supplied from the charging facility 300 to the battery 40 via the first plug 322, the charging cable 320, the second plug 324, and the charging port 70. The connection circuit may supply DC power transmitted from the battery 40 to the charging facility 300 via the charging port 70, the second plug 324, the charging cable 320, and the first plug 322. A lid (a charging port lid) that covers the charging port 70 and the indicator lamp 72 to be described below is provided in the vehicle M. The lid transitions from a closed state to an open state through, for example, a switch provided in the cabin.

The indicator lamp 72 is, for example, a lamp that is turned on when the battery is being charged and can enable a user or the like to visually recognize that the battery is being charged according to an ON state of the lamp. The indicator lamp 72 is installed, for example, in the vicinity of the charging port 70 (within a prescribed distance from the charging port 70). The indicator lamp 72 may be provided in the cabin in addition to (or in place of) the vicinity of the charging port 70. Control of the color when the indicator lamp 72 is turned on and ON, blink, and OFF of the indicator lamp 72 is performed by the display control device 100.

The battery sensor 42 includes, for example, a current sensor, a voltage sensor, and a temperature sensor. The battery sensor 42 detects a current value, a voltage value, and a temperature of the battery 40 using, for example, the sensors. The battery sensor 42 may detect whether or not the vehicle M is being charged with the power supplied from the charging facility 300. For example, the battery sensor 42 detects that the battery 40 is being charged when the second plug 324 is connected to the charging port 70. When a configuration in which the vehicle M can be charged without contact with the charging facility 300 is provided, the battery sensor 42 may detect information indicating which charging facility 300 the vehicle M is being charged with power supplied from on the basis of a result of communication with the charging facility 300 and a state of charge of the battery 40. The battery sensor 42 may measure a charging count and an amount of charge of the battery 40. The charging count is, for example, the number of times the battery 40 was charged by the charging facility 300. The charging count may or may not include the number of times the battery 40 was charged with the above-described power generation energy or regenerative energy. The charging amount may or may not include an amount of power with which the battery 40 is charged by the above-described generated energy or regenerative energy. The battery sensor 42 may detect an amount of power of the battery 40 consumed by the running of the vehicle M or the like (power consumption). The battery sensor 42 outputs the detected information and the charging count to the controller 36 or the display control device 100.

The communication device 50 includes a wireless module for connecting a cellular network or a Wi-Fi network. The communication device 50 transmits information from the controller 36 and the display control device 100 to the management server 200 via the network NW. The communication device 50 receives the information transmitted by the management server 200 and outputs the received information to the display control device 100.

The display 80 is, for example, a liquid crystal display (LCD) or an organic electro-luminescence (EL) display, or the like. The display 80 is installed on, for example, a meter panel including an instrument such as a vehicle speed meter provided on an instrument panel in front of the driver's seat where a steering wheel in the cabin is provided. The display 80 is installed, for example, near the center of the instrument panel in the cabin. The display 80 may be a display on which a human machine interface (HMI) of another in-vehicle device (for example, the navigation device 90) is provided. The display 80 displays information provided to the user in the vehicle M on the basis of the control of the display control device 100 (for example, information about the use of the battery 40, traffic guidance, and vehicle information). The display 80 may be a touch panel or the like, and may receive instructions from the user in this case. In the display 80, a portion (equipment) capable of displaying a state of the battery 40 or the like of the vehicle M by lighting or blinking may be included. For example, a lamp body provided outside of the vehicle body such as a daytime running light (DRL) or an emblem, and a lamp body provided in the cabin such as lighting equipment for an ambient light or a room lamp and an indicator is included in the portion.

The navigation device 90 has, for example, a global navigation satellite system (GNSS) receiver, a guidance controller, a storage storing map information, and the like. The GNSS receiver identifies a location of the vehicle M on the basis of signals received from GNSS satellites. A location of the vehicle M may be identified or corrected by an inertial navigation system (INS) using an output of the vehicle sensor 20. For example, the guidance controller decides on a route from the location of the vehicle M identified by the GNSS receiver (or any input position) to a destination input by the occupant with reference to the map information and causes the display 80 to output guidance information via the display control device 100 so that the vehicle M runs along a path. The map information is, for example, information in which a road shape is expressed by a link indicating a road and nodes connected by the link. The map information may include the number of lanes and curvature of a road, point of interest (POI) information, and the like. The map information may include location information of the charging facility 300, information (identification information) for identifying the charging facility 300, and the like. The map information may be stored in the storage 160 of the display control device 100 to be described below. The navigation device 90 may transmit a current position and a destination of the vehicle M to a navigation server via the communication device and acquire a route from the navigation server.

The display control device 100 includes, for example, a charging determiner 110, a facility identifier 120, an acquirer 130, a deriver 140, a display controller 150, and the storage 160. The charging determiner 110, the facility identifier 120, the acquirer 130, the deriver 140, and the display controller 150 are implemented, for example, by a hardware processor such as a central processing unit (CPU) executing the program (software). Also, some or all of the above components may be implemented by hardware (including a circuit; circuitry) such as a large-scale integration (LSI) circuit, an application-specific integrated circuit (ASIC), a field-programmable gate array (FPGA), or a graphics processing unit (GPU) or may be implemented by software and hardware in cooperation. The program may be pre-stored in a storage device (a non-transitory storage medium) such as a hard disk driver (HDD) or a flash memory or may be stored in a removable storage medium (a non-transitory storage medium) such as a digital video disc (DVD) or a compact disc (CD)-read-only memory (ROM) and installed when the storage medium is mounted in a drive device.

The storage 160 may be implemented by the above-described various storage devices, an electrically erasable programmable read-only memory (EEPROM), a ROM, a random-access memory (RAM), or the like. The storage 160 stores, for example, battery information 162, display mode information 164, programs, and various types of other information. The storage 160 may store map information. Details of the battery information 162 and the display mode information 164 will be described below.

The charging determiner 110 determines whether or not the battery 40 of the vehicle M is being charged. For example, the charging determiner 110 refers to, for example, the map information of the navigation device 90 on the basis of the location information of the vehicle M detected by the location sensor of the vehicle sensor 20, and determines that charging is in progress when the location of the vehicle M is within a prescribed distance from the installation location of the charging facility 300 and the above-described second plug 324 is connected to the charging port 70. Instead of the case where the second plug 324 is connected to the charging port 70, the charging port 70 may be in a state in which a connection to the second plug 324 is possible. In the case of a state in which a connection is possible, for example, the lid (the charging port lid) is in an open state. The charging determiner 110 may determine that charging is in progress when an amount of power with which the battery 40 is charged for a prescribed period of time is greater than or equal to a threshold value. The charging determiner 110 may determine whether or not the battery 40 is being charged on the basis of information obtained from the battery sensor 42. The charging determiner 110 may determine that charging is not in progress with power generation energy or regenerative energy from the motor 12.

The facility identifier 120 identifies the charging facility 300 that is charging the battery 40 with power when the charging determiner 110 determines that the battery 40 is being charged. For example, the facility identifier 120 may acquire information for identifying the charging facility 300 from the charging facility 300 via the signal cable attached to the charging cable 320 or may acquire information for identifying the charging facility with reference to the map information on the basis of the location information of the vehicle M. The facility identifier 120 may acquire the location information of the charging facility 300.

The acquirer 130 acquires information output from the vehicle sensor 20, the controller 36, or the battery sensor 42 and information received by the communication device 50. Content received by the communication device 50 includes information transmitted from the management server 200. The acquirer 130 transmits information (for example, identification information) for identifying the charging facility 300 identified by the facility identifier 120 to the management server 200 and acquires information including the source information of the power supplied by the charging facility 300 from the management server 200.

The acquirer 130 stores information including the acquired source information in the storage 160 as the battery information 162. FIG. 3 is a diagram showing an example of the battery information 162. In the battery information 162, an amount of power and source-related information are associated with a charging date and time and a charging location. In the charging date and time, for example, the time when charging started and the time when charging ended are stored. In the charging location, for example, location information and identification information of the charging facility 300 by which a charging process is being performed are stored by the facility identifier 120. The amount of power is stored as an amount of power with which charging is in progress at the charging location. The amount of power may include a value (for example, a percentage [%]) indicating how much power has been used for charging within the maximum amount of power with which the battery 40 can be charged. The source-related information is information including source information, and includes, for example, source information and information about a power coefficient associated with a source. It is possible to virtually distinguish and manage the power with which the battery 40 is charged, for example, as power having a different power coefficient, using the battery information 162.

The acquirer 130 may manage the battery information 162 as the current battery level. In this case, a total value (P1+P2+P3) of amounts of power stored in the battery information 162 is managed as the battery level.

The acquirer 130 may acquire an amount of power consumed by the running of the vehicle M or the like from the battery sensor 42 and update the battery information 162 on the basis of the acquired amount of power. In this case, the acquirer 130 causes an update process to be performed so that power is consumed on the basis of priorities preset on the basis of the source-related information. The priorities are set in, for example, ascending order of the environmental load level or the power coefficient. The priorities may be set in, for example, descending order of the environmental load level or the power coefficient.

The deriver 140 derives the environmental load level (the influence level of the environmental load) of the power with which the battery 40 is charged on the basis of the source information acquired by the acquirer 130 and the like. For example, the deriver 140 refers to the battery information 162 and derives the environmental load level for each source (power coefficient) of the power with which the battery 40 is charged. The deriver 140 may refer to the battery information 162 and derive a composition ratio (which source of power is included in what percentage of the battery level) in the power with which the battery 40 is charged (the battery level) as the environmental load level.

Here, a specific example will be described. For example, it is assumed that the battery information 162 stores amounts of power from two different sources (source A and source B) and source A has a smaller power coefficient than source B. In this case, the deriver 140 derives an environmental load level as $20/(80+20)=0.2$ when 80% of the battery level is the power of source A and 20% is the power of source B. The environmental load level may be derived using a prescribed function (a calculation formula) and may be derived using a trained model in which the environmental load level is output when the composition ratio of sources is input. A corresponding table in which the composition ratio of the sources and the environmental load level are associated may be stored in the storage 160 or the like in advance, and the environmental load level may be derived using the corresponding table. For example, when 80% of the battery level is the power of source A and 20% is the power of source B, the environmental load level has a smaller value than when 50% of the battery level is the power of source A and 50% thereof is the power of source B. The deriver 140 may derive an environmental load level that is an influence level of the environmental load of the power with which the battery 40 is charged on the basis of the source information acquired by the acquirer 130 and allocate a different color in accordance with the environmental load level.

The display controller 150 causes the display 80 to display information about the vehicle M obtained from the vehicle sensor 20, the controller 36, the battery sensor 42, the communication device 50, the navigation device 90, and the like. For example, when the vehicle M receives power supplied from the outside (the charging facility 300), the display controller 150 causes the indicator lamp 72 and the display 80 to display information indicating that the vehicle M is being charged. On the basis of a result derived by the deriver 140, the display controller 150 generates an image in which the environmental load level is associated with a breakdown of the battery level of the battery 40 and causes the display 80 to display the generated image. The display controller 150 refers to the display mode information 164 stored in the storage 160, decides on a color to be displayed or the like for each source of power (or for each environmental load level or power coefficient according to the source), generates a color image according to the battery level, and causes the display 80 to display the color image.

FIG. 4 is a diagram showing an example of the display mode information 164. The display mode information 164 is, for example, information in which the source-related information is associated with the power coefficient and the display mode. The display mode includes, for example, information about a hue and information about the presence or absence of blinking, a pattern, and a character font and size. In the example of FIG. 4, information is stored so that it is displayed in a different color for each environmental load level (source or power coefficient). Although information is stored so that it is displayed in a lighter hue as the power coefficient associated with the source-related information is smaller in the example of FIG. 4, the present invention is not limited thereto. The display controller 150 can provide the user with the source of the power with which the battery 40 is charged by causing the battery level to be displayed on the basis of the display mode shown in FIG. 4. The display controller 150 may cause a sound corresponding to the power coefficient of the power used virtually by the vehicle M to be output from a speaker (an example of a sound output) mounted on the vehicle M. Specific examples of images displayed in the display control device 100 described above (for example, an image indicating the battery level) will be described below.

[Management Server]

Figure 5:
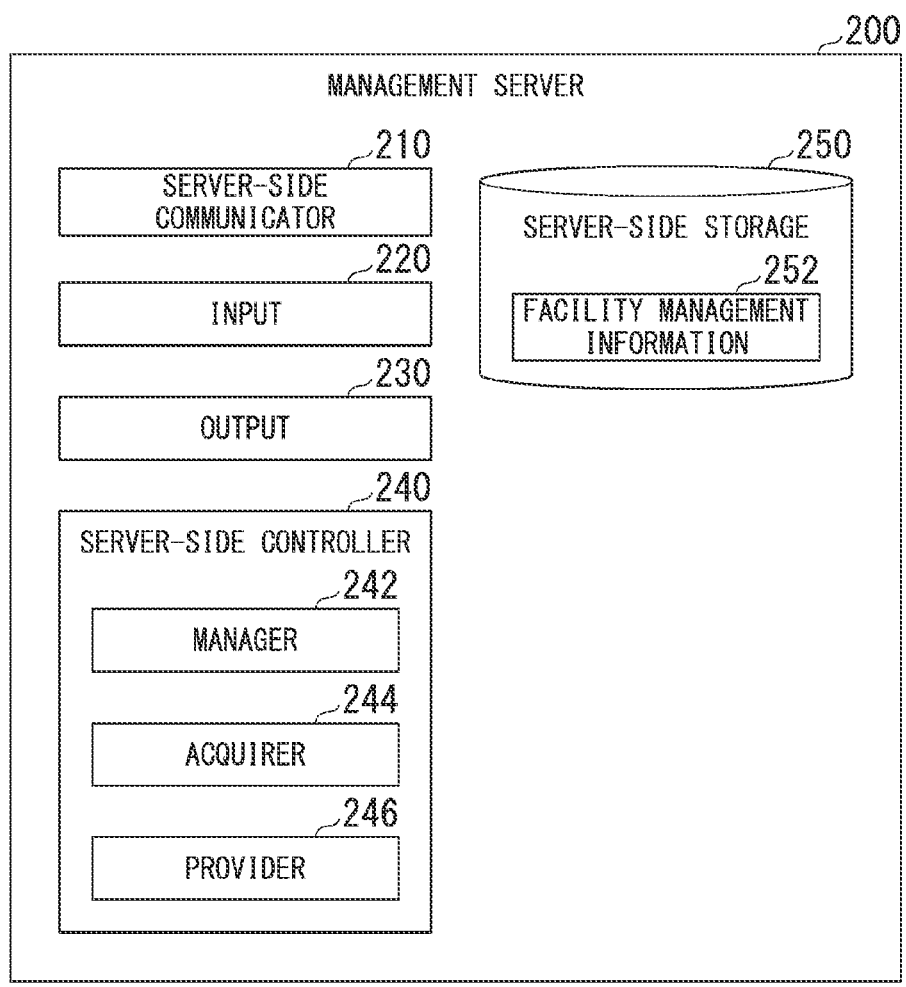
FIG. 5 is a diagram showing an example of a configuration of a management server of the embodiment.

FIG. 5 is a diagram showing an example of a configuration of the management server 200 of the embodiment. The management server 200 includes, for example, a server-side communicator 210, an input 220, an output 230, a server-side controller 240, and a server-side storage 250. For example, the management server 200 may function as a cloud server that communicates with the vehicle M and the charging facility 300 via the network NW and transmits and receives various types of data.

The server-side communicator 210 communicates with the vehicle M and other external devices via the network NW using, for example, a cellular network, a Wi-Fi network, Bluetooth, or the like. The server-side communicator 210 may include a communication interface such as a network interface card (NIC).

The input 220 is, for example, a user interface such as a button, a keyboard, or a mouse. The input 220 receives an operation of a server administrator or the like. The input 220 may be a touch panel configured to be integrated with the display of the output 230.

The output 230 outputs information to the server administrator or the like. The output 230 includes, for example, a display that displays an image and a sound output that outputs a sound. The display includes, for example, a display device such as an LCD or an organic EL display. The display displays an image of information output by the server-side controller 240. The sound output is, for example, a speaker. The sound output outputs a sound of the information output by the server-side controller 240.

The server-side controller 240 includes, for example, a manager 242, an acquirer 244, and a provider 246. Each component of the server-side controller 240 is implemented, for example, by a hardware processor such as a CPU executing the program stored in the server-side storage 250. Also, some or all of the above components of the server-side controller 240 may be implemented by hardware (including a circuit; circuitry) such as an LSI circuit, an ASIC, an FPGA, or a GPU or may be implemented by software and hardware in cooperation. The above-described program may be pre-stored in a storage device (a storage device including a non-transitory storage medium) such as an HDD or a flash memory of the management server 200 or may be stored in a removable storage medium such as a DVD, a CD-ROM, or a memory card and installed in the storage device of the management server 200 when the storage medium (a non-transitory storage medium) is mounted in a drive device, a card slot, or the like.

The server-side storage 250 may be implemented, for example, by the various types of storage devices described above, an EEPROM, a ROM, a RAM, or the like. The server-side storage 250 stores, for example, facility management information 252, programs, various types of other information, and the like.

The manager 242 manages information including an installation position and source information of supplied power for each charging facility 300. The manager 242 may manage information including the source information of power supplied from the home based on an electric power company, contract information, or the like when the charging facility 300 is located in the home of the user of the vehicle M.

Figures 6, 7:
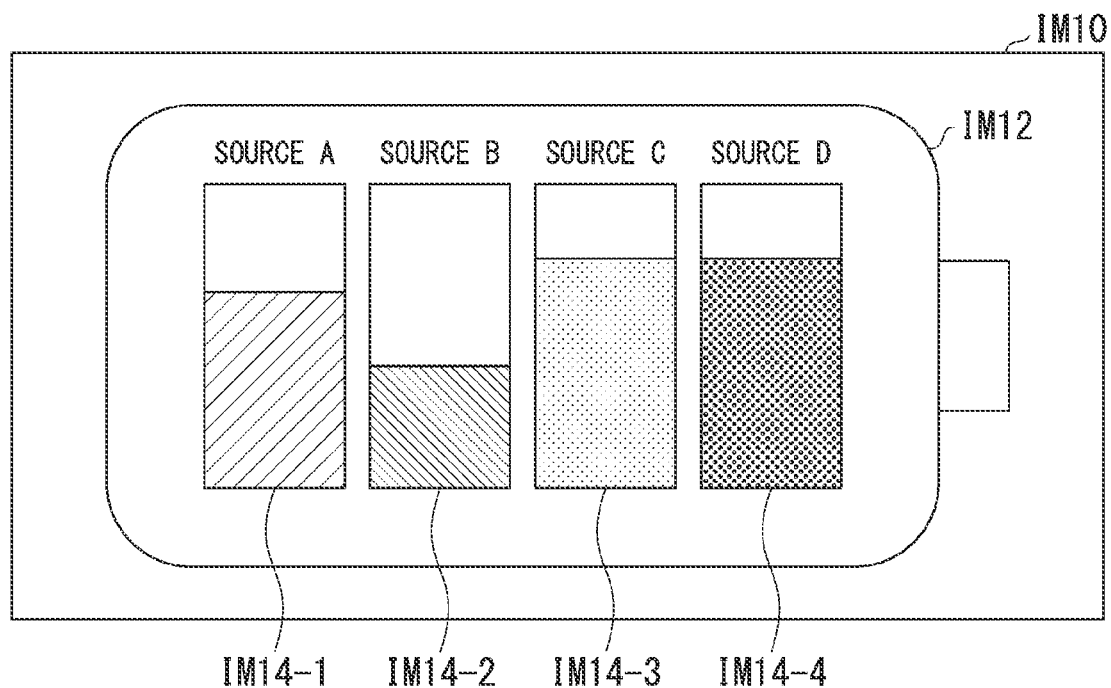
FIG. 6 is a diagram showing an example of facility management information.
FIG. 7 is a diagram showing an example of an image in which a battery level is displayed in a first display mode.

For example, the manager 242 stores and manages the above-described information as facility management information 252 in the server-side storage 250. FIG. 6 is a diagram showing an example of the facility management information 252. The facility management information 252 is, for example, information in which location information and generation source information are associated with a charging facility ID that is identification information of the charging facility 300. The location information is, for example, latitude/longitude information. For example, when a plurality of charging spots are located in a parking lot of a commercial facility, each charging spot is managed.

When there is an inquiry about source information of power from the vehicle M or the charging facility 300, the acquirer 244 refers to the facility management information 252 on the basis of location information of the vehicle M transmitted with the inquiry or identification information of the charging facility 300 and acquires source-related information associated with a matching charging facility ID or location information. The provider 246 transmits the information acquired by the acquirer 244 to the vehicle M or the charging facility 300 that has transmitted the inquiry.

[Display Mode of Image Indicating Battery Level]

Next, an example of a display mode of an image indicating the battery level in the embodiment will be described. The display controller 150 generates an image in which an amount of power with which the battery 40 is charged (the battery level) is displayed in the display mode that can be identified for each source at the environmental load level derived by the deriver 140 and causes the display 80 to display the generated image.

FIG. 7 is a diagram showing an example of an image IM10 in which the battery level is displayed in the first display mode. In the image IM10 shown in FIG. 7, an image IM12 representing the battery 40 and images IM14-1 to IM14-4 representing amounts of power for source information are shown. The image IM10 may display information indicating content of each source. In the example of FIG. 7, it is assumed that, among sources A to D, a power coefficient of source A is smallest and power coefficients of source B, source C, and source D are larger in that order.

For example, the display controller 150 classifies the environmental load level for each source on the basis of the composition ratio of amounts of power with which the battery 40 is charged stored in the battery information 162, generates the images IM14-1 to IM14-4 artificially expressed with information of a breakdown of the battery level, and causes the display 80 to display the images IM14-1 to IM14-4. Thereby, the user can easily ascertain a breakdown of a source from which the power with which the battery 40 of the vehicle M is charged is generated. Therefore, the user can easily determine whether the power used for charging is clean (environmentally friendly or ecological).

Figure 8:
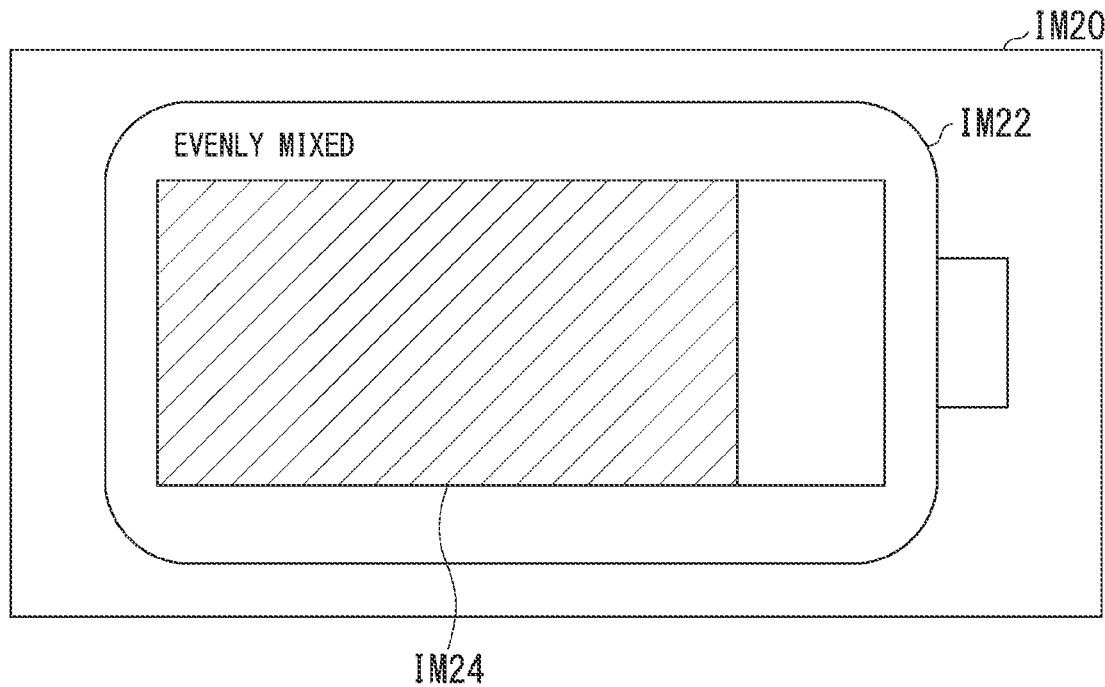
FIG. 8 is a diagram showing an example of an image in which a battery level is displayed in a second display mode.

The display controller 150 may cause the total battery level to be displayed by mixing amounts of power with which the battery 40 is charged (battery levels) in different colors associated with environmental load levels. FIG. 8 is a diagram showing an example of an image IM20 in which the battery level is displayed in a second display mode. In the image IM20 shown in FIG. 8, an image IM22 representing the battery 40 and an image IM24 in which the battery level is displayed in a color corresponding to the environmental load level are shown. Here, the color associated with each environmental load level is, for example, a color associated with each power source (or each power coefficient). For example, when the sources of the power with which the battery 40 is charged are source A, source B, and source C, the display controller 150 generates the image IM24 indicating the battery level in a color obtained by evenly mixing colors associated with the sources. The display controller 150 may adjust a color mixing ratio in accordance with a composition ratio of source A, source B, and source C. Thereby, for example, even if the battery level is the same, when a constituent proportion of source A in the composition ratio is larger, the battery level is displayed in a color closer to the color associated with source A, such that the breakdown of the power source can be ascertained to some extent. Like the first display mode, the second display mode can enable the user to easily ascertain how clean the power obtained in the charging process is (whether it is power of a small power coefficient).

The display controller 150 may display numerical values indicating a composition ratio of the sources and amounts of power thereof in the first display mode and the second display mode. The display controller 150 may cause a display process to be performed by switching the display mode between the first display mode and the second display mode on the basis of a prescribed condition. The display controller 150 may switch the display mode according to, for example, the user's selection, and may cause a display process to be performed in the second display mode when the battery level is greater than or equal to a threshold value and may cause a display process to be performed in the first display mode when the battery level is less than the threshold value.

The display controller 150 may generate an image indicating the battery level of the battery 40 so that consumption occurs in an order corresponding to the environmental load level (which may be referred to as a source or power coefficient) virtually according to consumption of the power with which the battery 40 is charged.

Figure 9:
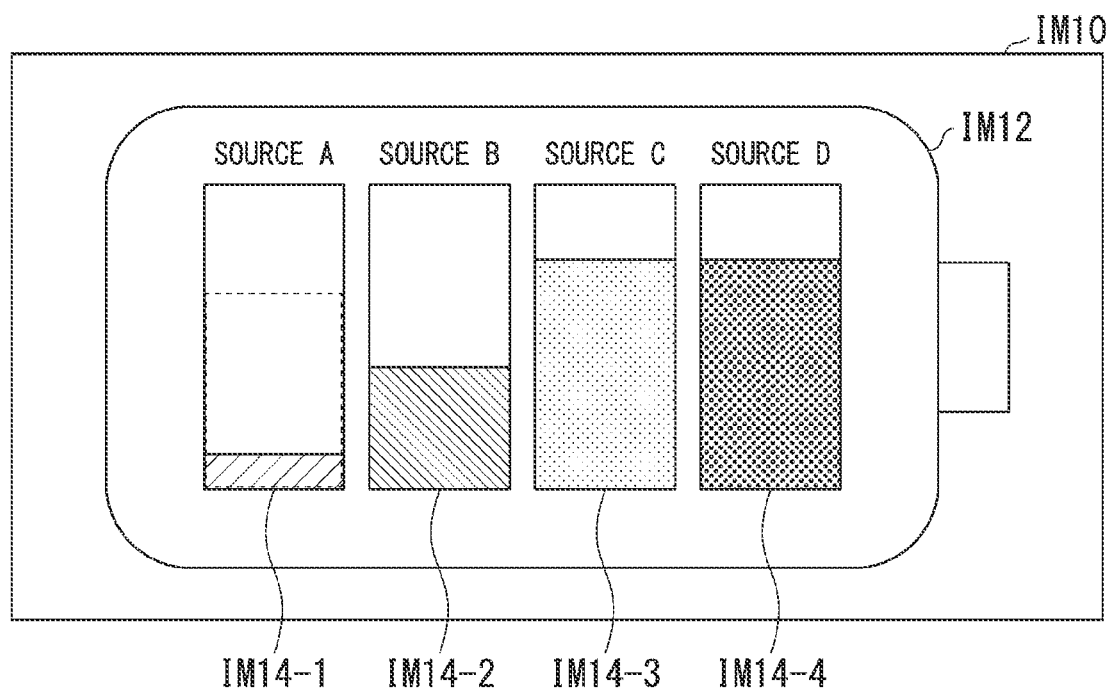
FIG. 9 is a diagram for describing a change in display content according to power consumption in the first display mode.

FIG. 9 is a diagram for describing a change in display content according to power consumption in the first display mode. In the example of FIG. 9, an image IM10 in the first display mode described above is shown. For example, the display controller 150 generates an image IM20 in which power having a small power coefficient (a low environmental load level) is preferentially reduced according to the power consumption on the basis of the amount of power with which the battery 40 is charged and causes the display 80 to display the generated image IM20. In the example of FIG. 9, a battery level indicated by source A having a lowest power coefficient is reduced. Thereby, it is possible to simulatively visually recognize that the clean power is decreasing with the power consumption of the battery 40 and therefore the user can easily have the intention to charge the battery 40 with source power having a small power coefficient.

In the case of an image display process in the second display mode, the display controller 150 causes power having a small power coefficient (a low environmental load level) to be preferentially reduced according to the power consumption of the battery 40, generates an image in which a color mixing ratio is sequentially changed in accordance with a composition ratio for each environmental load level (power coefficient or source) when the power is reduced, and causes the display 80 to display the generated image. In the image display process in the second display mode, a display process is performed by sequentially changing the color mixing ratio even if the battery 40 is being charged.

When the battery is charged with the power generation energy or regenerative energy from the motor 12, the display controller 150 may not sequentially change the battery level and the mixed color. Because the amount of power generation energy and the amount of regenerative energy from the motor 12 are smaller than the amount of power from the charging facility 300, a process in which the mixed color frequently changes with the amount of power generation energy and the amount of regenerative energy and the color flickers can be suppressed. In the first display mode or the second display mode, when the battery 40 is charged with the power generation energy or regenerative energy from the motor 12, the display controller 150 may cause a display process to be performed in a display mode in which each amount of energy can be identified from an amount of energy from the charging facility 300. Thereby, it is possible to provide the user with more detailed information about the source of the power with which the battery 40 is charged.

The display controller 150 causes the indicator lamp 72 or a prescribed location of the display 80 to be in a light-on state when the vehicle M is supplied with power from the outside (the charging facility 300) (when the vehicle M is being charged). In this case, the display controller 150 causes a color associated with the environmental load level (or the source or the power coefficient) of the power during charging to be displayed. Thereby, the user can more clearly ascertain what source of power is currently being used for charging.

When the vehicle M arrives at the charging facility 300, the display controller 150 may acquire source information of the power to be supplied by the charging facility 300 identified by the location information of the vehicle M and cause the display 80 to display the acquired source information before charging starts. Thereby, because the user can ascertain the source of the power to be used for charging in advance, eco-charging can be promoted by taking measures such as changing the charging facility 300.

When the user has searched for the charging facility 300 with the navigation device 90, the display controller 150 may acquire source-related information of the charging facility 300 extracted in the search from the management server 200 and cause the display 80 to display the charging facility 300 together with the source-related information. Thereby, the user can select the charging facility 300 on the basis of the power source information.

Instead of (or in addition to) displaying images as shown in FIGS. 7 and 8, the display controller 150 may cause a prescribed portion of the vehicle to be displayed in a light-on state in a color corresponding to the environmental load level derived by the deriver 140 by virtually associating current power consumption of the vehicle M and the source information. The prescribed portion is, for example, a lamp body provided outside of the vehicle body of the vehicle M such as a daytime running light or emblem and a lamp body provided in the cabin such as an ambient light, a room lamp, or an indicator lamp included in the display 80.

In this case, the display controller 150 acquires the source information corresponding to the battery level of the battery 40 and turns on and displays the lamp body as if power having a small power coefficient (a low environmental load level) is preferentially consumed in accordance with the current power consumption. Therefore, for example, on the basis of the amount of power with which the battery 40 is charged during the running of the vehicle M, when power with the low environmental load level is preferentially reduced according to power consumption, the prescribed portion is displayed in a light-on state in a color associated with source A when the battery level indicated by source A is reduced as shown in FIG. 9. Thereby, a display process based on the source information of power consumption can be implemented by turning on and displaying a lamp body such as lighting equipment instead of (or in addition to) an image display process. Thereby, it is possible to make it easier for the user to ascertain the source of the power that is consumed.

In a display control process for various types of images, lighting, and the like related to the battery 40 by the above-described display control device 100, it is possible to prompt the user to use more environmentally friendly energy. The display control device 100 may transmit information about the amount of power consumed by the running of the vehicle M, information about the battery information 162, and information about the mileage of the vehicle M to the management server 200. In this case, the manager 242 of the management server 200 manages GHG emission amounts during the running of the vehicle M from the acquired power consumption amount, source information, and the like.

[Processing Flow]

Next, a flow of a process executed by the display control device 100 of the embodiment will be described. Hereinafter, a display control process for power with which the battery 40 is charged among processes executed by the display control device 100 will be described mainly. Also, in the following process, a process of acquiring source information of supplied power and a process of displaying a breakdown of the battery level on the basis of the source information into which the display control process is divided will be described. The process of the present flowchart may be iteratively executed, for example, at prescribed timings.

Figure 10:
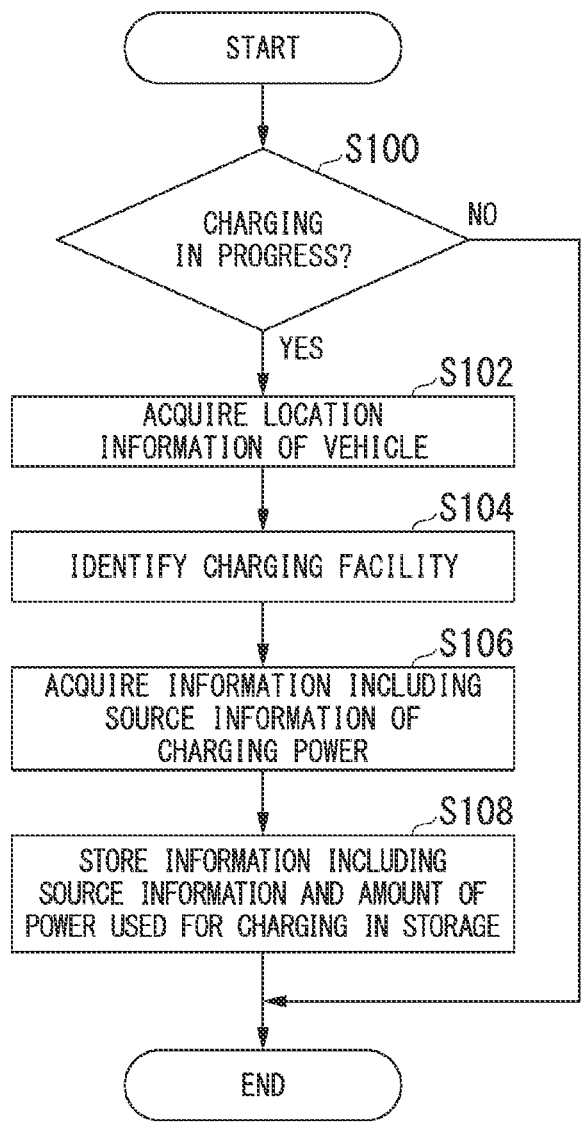
FIG. 10 is a flowchart showing an example of a source information acquisition process.

FIG. 10 is a flowchart showing an example of the source information acquisition process. In the example of FIG. 10, the charging determiner 110 determines whether or not the vehicle M is being charged (during a charging operation) (step S100). When it is determined that charging is in progress, the facility identifier 120 acquires location information of the vehicle M (step S102) and identifies a charging facility 300 on the basis of the acquired location information (step S104).

Subsequently, the acquirer 130 acquires information including source information of charging power from the management server 200 on the basis of charging facility information (step S106) and causes the storage 160 to store the acquired information and an amount of power used for charging as the battery information 162 (step S108). Thereby, the process of the present flowchart ends. When it is determined that charging is not in progress in the processing of step S100, the process of the present flowchart ends.

Figure 11:
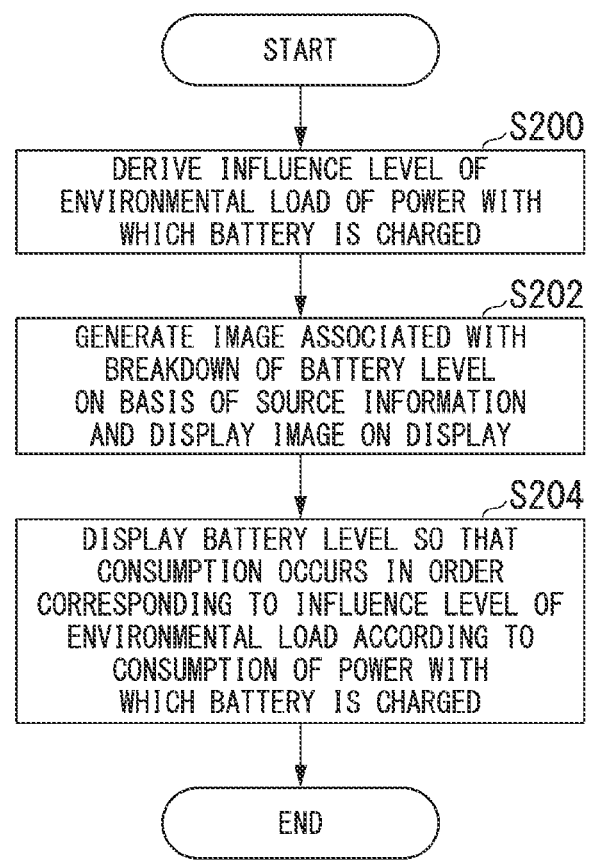
FIG. 11 is a flowchart showing an example of a display control process.

FIG. 11 is a flowchart showing an example of the display control process. In the example of FIG. 11, the deriver 140 derives an environmental load level of power with which the battery 40 is charged on the basis of the battery information 162 and the like (step S200). Subsequently, the display controller 150 generates an image associated with a breakdown of the battery level on the basis of source information of power having different power coefficients, and causes the display 80 to display the generated image (step S202).

Subsequently, the display controller 150 causes the battery level to be displayed so that consumption occurs in an order corresponding to the influence level of the environmental load according to consumption of the power with which the battery 40 is charged (step S204). Thereby, the process of the present flowchart ends. In the processing of steps S202 and S204, the display controller 150 may cause an image obtained by mixing (evenly mixing) colors based on levels to be displayed.

Modified Examples

At least a part of the configuration included in the management server 200 of the embodiment may be provided in the vehicle M and at least a part of the configuration included in the vehicle M may be provided in the management server 200. In the embodiment, the display control device 100 may cause the generated image to be displayed on a terminal device owned by the user instead of the display 80 mounted in the vehicle M. In that case, the display control device 100 and the terminal device are communicatively connected according to, for example, short-range communication such as Bluetooth. In the embodiment, the facility management information 252 managed by the management server 200 may have its own information managed by each charging facility 300.

The above-described embodiment may be applied to a vehicle using not only the battery 40 but also another drive source such as a hydrogen engine. In the above-described embodiment, the display mode (for example, a color, the presence or absence of blinking, a pattern, and a character font and size) corresponding to the above-described power coefficient range (evaluation range) and environmental load level (source or power coefficient) may be arbitrarily set by the user. In this case, the display controller 150 updates the display mode information 164 on the basis of setting information received from the user by the display 80 or the like.

In the above-described embodiment, the acquirer 130 may directly acquire the source information from the charging facility 300 instead (or in addition to) acquiring the source information of power supplied by the charging facility 300 identified on the basis of the location information of the vehicle M from the management server 200. When the source information can be acquired from the management server 200 and the charging facility 300, the acquirer 130 may preferentially apply the source information acquired from the charging facility 300. For example, when the charging facility 300 is a home, even if it is the same charging facility 300, the battery 40 may be charged with power generated by a photovoltaic power generation system installed at the home on the basis of the weather, time, and the like at the time of charging and the battery 40 may be charged with power obtained from fossil-source grid power. Therefore, it is possible to acquire more accurate source information by preferentially applying the source information from the charging facility 300. As described above, when a charging process of the charging facility 300 whose source information changes in accordance with an environment at the time of charging such as weather and a time period as described above is performed, the acquirer 130 may estimate the source information in accordance with the weather at the time of charging and the charging time period at a position where the charging facility 300 is located.

In the embodiment, the server-side controller 240 of the management server 200 collects and manages the evaluation result of the environmental load level for each vehicle M and therefore may measure or evaluate emissions of GHG indirectly emitted by the vehicle M after sales. Thereby, on the basis of the measurement results and evaluation results of GHG emission amounts, for example, it can be used for life cycle assessment (LCA) of vehicle manufacturing companies or vehicle sales companies.

According to the embodiment as described above, the acquirer 130 configured to acquire information including source information of power that is supplied when the battery 40 mounted in a vehicle is charged; the deriver 140 configured to derive an environmental load level that is an influence level of an environmental load of the power with which the battery 40 is charged on the basis of the source information acquired by the acquirer; and the display controller 150 configured to cause a display to display an image in which the environmental load level derived by the deriver 140 is associated with a breakdown of a battery level of the battery 40 are provided, thereby prompting a user to use energy more suitable for an environment. Also, the present invention contributes to improving energy efficiency.

According to the embodiment, power with which the battery 40 is charged can be virtually divided and managed for each environmental load level. According to the embodiment, by operating an indicator lamp or the like in a color corresponding to the source information of the power at the time of charging, it is possible to make it easier for the user to ascertain whether or not power used for charging is clean (environmentally friendly or ecological). Therefore, it is possible to guide a user to have a change in behavior such as searching for a charging facility 300 capable of performing a charging process with clean power. Therefore, according to the embodiment, $CO_2$ emission amounts and the like in the running of the vehicle M can be reduced.

The embodiment described above can be represented as follows.

A display control device including:
a storage device storing a program; and
a hardware processor,
wherein the hardware processor executes the program to:
acquire information including source information of power that is supplied when a battery mounted in a vehicle is charged;
derive an environmental load level that is an influence level of an environmental load of the power with which the battery is charged on the basis of the acquired source information; and
cause a display to display an image in which the derived environmental load level is associated with a breakdown of a battery level.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A display control device comprising:
a processor that executes instructions to:
acquire information including source information of power that is supplied when a battery mounted in a vehicle is charged;
derive an environmental load level that is an influence level of an environmental load of the power with which the battery is charged on the basis of the source information;
cause a display to display an image in which the environmental load level is associated with a breakdown of a battery level;
determine whether or not the vehicle is being charged, and
identify a charging facility on the basis of location information of the vehicle when the vehicle is being charged,
wherein the processor acquires the source information of the power with which the vehicle has been charged from the charging facility.

2. The display control device according to claim 1, wherein the processor causes the display to display the battery level in a display mode in which identification is possible for each piece of the source information of the power.

3. The display control device according to claim 1, wherein the processor generates an image indicating the battery level so that consumption occurs in an order corresponding to the environmental load level virtually according to consumption of the power with which the battery is charged and causes the generated image to be displayed.

4. The display control device according to claim 3, wherein the processor generates an image indicating the battery level so that the consumption occurs from power of a lowest environmental load level virtually.

5. The display control device according to claim 3,
wherein the processor derives a different color in accordance with the source information as the environmental load level, and
causes the display to display an image in which the battery level is shown in a color obtained by mixing different colors according to the source information.

6. The display control device according to claim 1, wherein the processor causes a color of an indicator lamp provided at a position within a prescribed distance from a charging port or an image indicating that charging is in progress displayed on the display to be displayed in a color according to the environmental load level when the vehicle is supplied with external power.

7. A display control device comprising:
a processor that executes instructions to:
acquire information including source information of power that is supplied when a battery mounted in a vehicle is charged;
derive an environmental load level that is an influence level of an environmental load of the power with which the battery is charged on the basis of the source information and allocate a different color in accordance with the environmental load level;
cause a prescribed portion of the vehicle to be displayed in a light-on state in a color corresponding to the environmental load level by virtually associating current power consumption of the vehicle and the source information;
determine whether or not the vehicle is being charged; and identify a charging facility on the basis of location information of the vehicle when the vehicle is being charged,
wherein the processor acquires the source information of the power with which the vehicle has been charged from the charging facility.

8. A display control method comprising:
acquiring, by a computer, information including source information of power that is supplied when a battery mounted in a vehicle is charged;
deriving, by the computer, an environmental load level that is an influence level of an environmental load of the power with which the battery is charged on the basis of the source information;
causing, by the computer, a display to display an image in which the environmental load level is associated with a breakdown of a battery level;
determining, by the computer, whether or not the vehicle is being charged;
identifying, by the computer, a charging facility on the basis of location information of the vehicle when the vehicle is being charged; and
acquiring, by the computer, the source information of the power with which the vehicle has been charged from the charging facility.

9. A computer-readable non-transitory storage medium storing a program for causing a computer to:
acquire information including source information of power that is supplied when a battery mounted in a vehicle is charged;
derive an environmental load level that is an influence level of an environmental load of the power with which the battery is charged on the basis of the source information;
cause a display to display an image in which the environmental load level is associated with a breakdown of a battery level;
determine whether or not the vehicle is being charged;
identify a charging facility on the basis of location information of the vehicle when the vehicle is being charged; and
acquire the source information of the power with which the vehicle has been charged from the charging facility.

* * * * *